United States Patent [19]

Bey

[11] 4,271,866

[45] Jun. 9, 1981

[54] DRAG BALL VALVE INCLUDING VARIABLE PRESSURE REDUCING MEANS

[75] Inventor: Roger Bey, Illzach, France

[73] Assignee: The Babcock & Wilcox Company, New Orleans, La.

[21] Appl. No.: 26,625

[22] Filed: Apr. 2, 1979

[51] Int. Cl.³ .......................... F16K 5/06; F16K 5/10
[52] U.S. Cl. ................................ 137/625.3; 251/121; 251/127
[58] Field of Search ...................... 251/121, 118, 127; 137/625.3

[56] References Cited

U.S. PATENT DOCUMENTS

| | | | |
|---|---|---|---|
| 1,697,481 | 1/1929 | Sloan | 251/127 X |
| 1,752,836 | 4/1930 | Conran | 251/121 |
| 3,359,999 | 12/1967 | Mueller | 251/174 X |
| 3,630,229 | 12/1971 | Nagel | 251/118 X |

Primary Examiner—Arnold Rosenthal

Attorney, Agent, or Firm—James A. Hudak; Vytas R. Matas; Joseph M. Maguire

[57] ABSTRACT

A drag ball valve (10) that can variable regulate the pressure drop to which the fluid passing therethrough is subjected while maintaining the fluid velocity nearly constant is disclosed. To accomplish this, a series of fixed disks (34) having apertures (36) therein and rotatable disks (42) having apertures (44) with flange-like projections (46) therein are aligned so that either an unobstructed straight fluid passage through the apertures in both types of disks is created or the fluid is diverted by the flange-like projections (46) causing pressure reductions due to a variable number of flow direction turns. By varying the number of fixed disks (34) and rotatable disks (42) used, and by varying the number of rotatable disks (42) that are so aligned, any number of flow direction turns and associated pressure drops from zero pressure drops to the total number of rotatable disks (42) used can be achieved.

11 Claims, 7 Drawing Figures

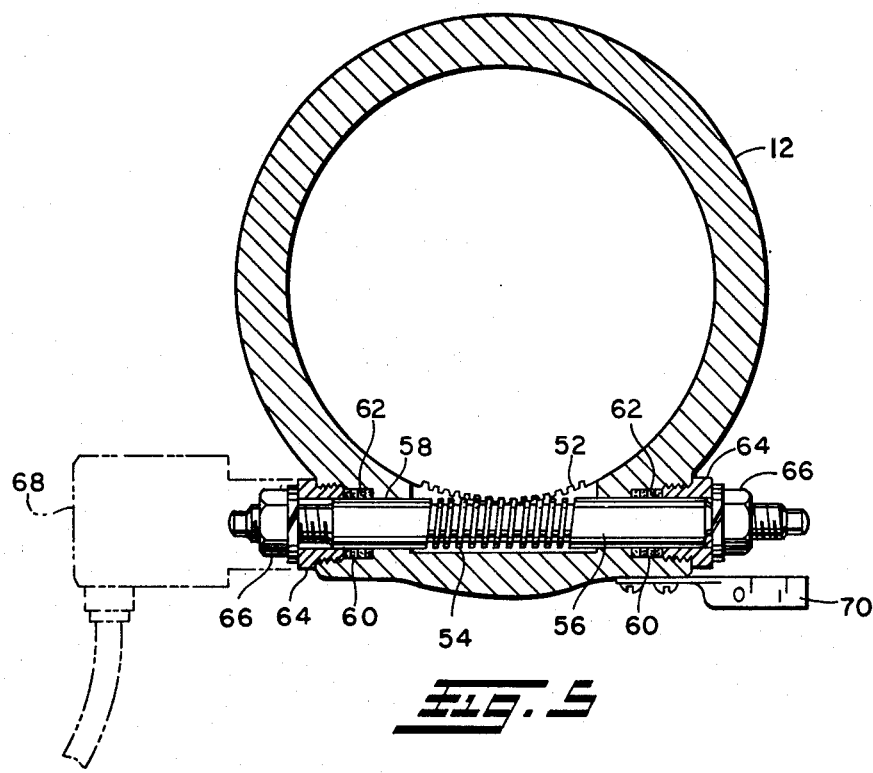
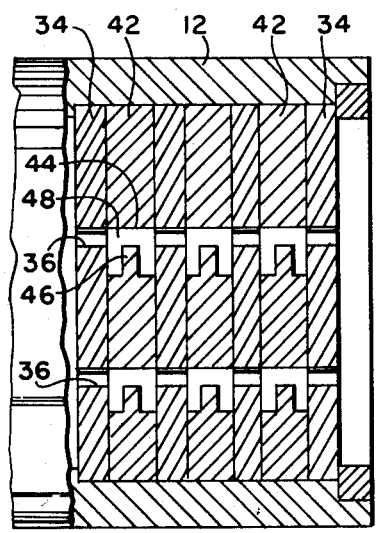
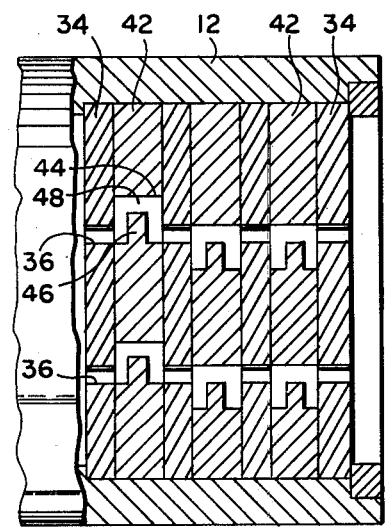

DRAG BALL VALVE INCLUDING VARIABLE PRESSURE REDUCING MEANS

TECHNICAL FIELD

This invention generally relates to drag valves, and more particularly to drag ball valves that can variably reduce the pressure of the fluid passing therethrough within a range of pressure drops.

BACKGROUND ART

Typically in the valve art, a reduction in the pressure of the fluid passing through the valve results in a corresponding increase in the velocity of the fluid. If the pressure reduction is substantial enough, the velocity of the fluid will approach sonic levels which results in excessive vibration and valve noise, both of which will hasten the deterioration of the valve. In addition, if the pressure of the fluid drops below its vaporization pressure, partial vaporization of the fluid may occur resulting in a process called cavitation which greatly accelerates the deterioration of the valve. These problems have been partially alleviated by drag valves which utilize multi-turn passageways to create a pressure drop while keeping fluid velocity nearly constant. However, these valves have no provisions for varying the number of multi-turn passageways to which the fluid passing therethrough is subjected. Thus, the pressure drop, i.e., the fluidic impedance, of these valves is preset and cannot be varied to compensate for various fluids which may pass through the valve. This drag valve concept has been applied to ball valves as may be seen in U.S. Pat. No. 4,085,774 which teaches a ball valve utilizing a plurality of contractions and expansions in the fluid passageways to produce a pressure drop. However, there is no teaching of accomplishing a pressure drop by a multi-turn labyrinth nor is there any teaching with respect to varying the pressure drop by varying the multi-turn labyrinth.

SUMMARY OF THE INVENTION

The present invention provides a solution to the aforementioned problem of a lack of variability in the pressure drop effected by ball valves as well as other problems. To accomplish this, a series of fixed and rotatable disks are provided, each having complementary apertures therein. These apertures are angularly displaced so that either a through portion of each aperture or a flange-like projection in each aperture in the rotatable disk is aligned with each aperture in the adjacent fixed disk. When the through portion of each aperture in the rotatable disk is aligned with each aperture in the adjacent fixed disk, a minimum pressure drop occurs since there are no turns in the fluid path. However, when the flange-like projection in each aperture in the rotatable disk is aligned with each aperture in the adjacent fixed disks, the pressure drop is a maximum since the fluid passing through the valve must traverse four right angle turns around the flange-like projection resulting in four direction changes per disk and a maximum number of turns for the valve. By varying the number of fixed disks and rotatable disks and by varying whether an aperture or a flange-like projection in a rotatable disk is aligned with each aperture in the adjacent fixed disk, any number of flow direction changes, in multiples of four, from zero to four times the total number of rotatable disks can be achieved to effectively provide variable pressure drops due to the variable turn flow paths.

BRIEF DESCRIPTION OF THE DRAWINGS

FIG. 5 is a cross-sectional view taken along section-indicating lines 5—5 in FIG. 1 and illustrates the means used for angularly displacing the rotatable disks.

FIG. 6 is a partial cross-sectional view of a series of rotatable disks and fixed disks and illustrates the relationship of the rotatable disks with respect to the fixed disks when the valve is in the minimum pressure drop condition.

FIG. 7 is a partial cross-sectional view of a series of rotatable disks and fixed disks and illustrates the relationship of a rotatable disk with respect to its adjacent fixed disks when maximum pressure drop is desired.

DESCRIPTION OF THE PREFERRED EMBODIMENT

Figure 1:
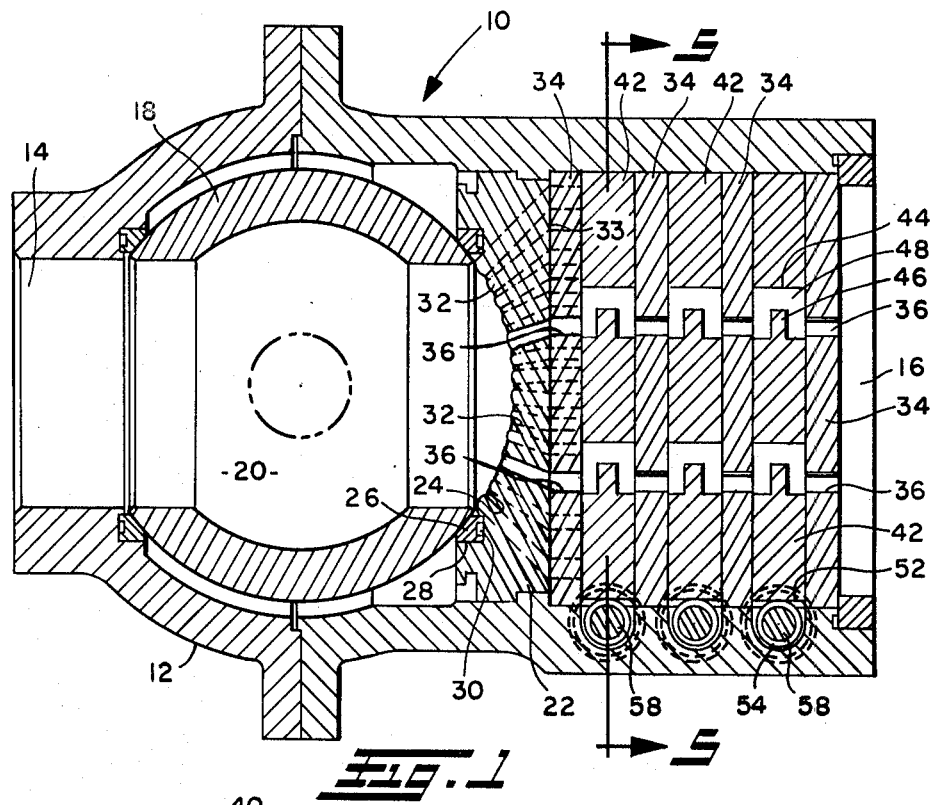
FIG. 1 is a cross-sectional view of a drag ball valve incorporating the invention of this disclosure and illustrates the relationship of the rotatable disks with respect to the fixed disks when the valve is in the maximum pressure drop condition.

Referring now to the drawings, FIG. 1 is a cross-sectional view of a ball valve 10 which includes the preferred embodiment of the invention. Ball valve 10 is comprised of a housing 12 with an inlet port 14 and an outlet port 16, and is a conventional rotary type ball valve which uses a ball 18 to regulate the flow of fluid therethrough. Ball 18 has a passage 20 therethrough and is rotated by means of a well-known handle (not shown) to regulate and control the amount of fluid flowing through valve 10 in a well-known manner.

Provided on the outlet side of ball 18 is a feeder ring assembly 22 which has a concave, semispherical indentation 24 therein so as to sealably mate with the ball. To insure proper and firm contact between the surface of ball 18 and the concave, semispherical surface 24 of feeder ring 22 and to prevent any leakage therebetween, a sealing ring 26 is received in a recess 28 provided in feeder ring 22. Sealing ring 26 is biased into contact with ball 18 by means of an elastic spring ring 30 which is interposed between the base of sealing ring 26 and recess 28. Spring ring 30 prevents any leakage between ball 18 and feeder ring 22 and compensates for wear between same due to usage.

Figure 2:
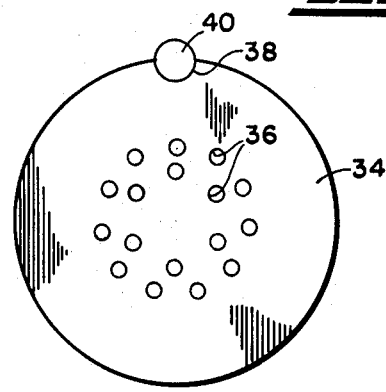
FIG. 2 is an elevation view of a fixed disk used in the FIG. 1 valve.

Feeder ring 22 has a plurality of passages 32 passing therethrough which emanate from concave semispherical surface 24. Passages 32 permit the communication of fluid through feeder ring 22 when valve 10 is open. Adjacent an outlet face 33 of feeder ring 22 is a disk 34 stationarily mounted in outlet port 16 and having a plurality of apertures 36 formed therein, as shown in FIG. 2. Apertures 36 are equal in number to and aligned with the passages 32 of the feeder ring 22. Disk 34 is typically circular in configuration and may be stamped from a metallic or other material that is non-corrosive to the usual fluids which pass through and are controlled by the valve 10. On the outer periphery of disk 34 is a semicircular groove 38 through which the shank portion of a bolt 40, which is threadably received in housing 12, passes preventing any angular displacement of disk 34.

Figure 3:
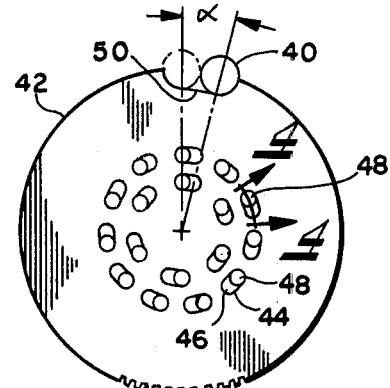
FIG. 3 is an elevation view of a rotatable disk used in the FIG. 1 valve.
Figure 4:
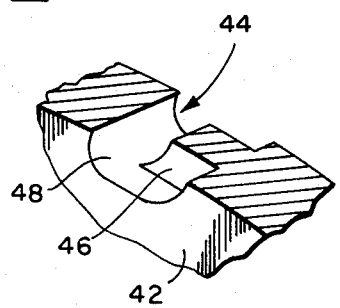
FIG. 4 is a partial cross-sectional view of an aperture in a rotatable disk taken along section-indicating lines 4—4 in FIG. 3.

Adjacent disk 34 is a rotatable disk 42, which also has a plurality of apertures, shown generally as numeral 44, therethrough, as shown in FIG. 3. The number and location of apertures 44 in rotatable disk 42 is complementary to the number and location of apertures 36 provided in stationary disk 34. Disk 42 is also typically circular in configuration and may be stamped from a non-corrosive metallic material, however, a secondary operation, such as coining or etching, is performed thereon to produce a flange-like projection 46 of material adjacent the through portion 48 of each aperture 44, as is shown in FIG. 4. These flange-like projections divert the flow of fluid during valve operation resulting in multi-turn fluid flow pressure drops. On the outer periphery of rotatable disk 42 is an elongated slot 50 in which is received the shank portion of bolt 40. Since slot 50 is elongated, bolt 40 cannot restrict the angular displacement of disk 42, however, the ends of slot 50 limit the angular displacement of disk 42 through a predetermined angle $\alpha$.

The outer periphery of disk 42 is also provided with a series of gear-like projections 52, as shown in FIG. 5, which are typically oppositely disposed from elongated slot 50. Gear-like projections 52 mate with threads 54 on a shaft 56 which is received in a bore 58 provided in the housing 12. The length of the arc which includes the gear-like projections 52 and the axial length of the threaded portion of shaft 56 are sufficient to permit disk 42 to be angularly displaced through the aforesaid predetermined angle $\alpha$.

In addition to being supported by bore 58, shaft 56 is also supported on its ends by packings 60 which are received in recesses 62 provided in housing 12 and by bearings 64 which are threadably received in housing 12. Both ends of shaft 56 are threaded and nuts 66 are threadably advanced thereon to engage the outer surface of bearings 64. When both nuts 66 are securely tightened, shaft 56 cannot move axially, and thus disk 42 cannot be angularly displaced. By loosening one of the nuts 66 while simultaneously tightening the other nut, shaft 56 can be moved axially within bore 58 causing disk 42 to rotate. In an alernate embodiment, nuts 66 are removed and a solenoid 68 (shown dotted) is attached to one end of shaft 56. When activated, solenoid 68 causes shaft 56 to move axially resulting in angular displacement of disk 42. In either embodiment, registration marks 70 can be provided on the valve to indicate the relative angular position of disk 42, i.e., whether the through portions 48 or the flange-like projections 46 of apertures 44 in disk 42 are aligned with apertures 36 in disk 34. Similarly, in either embodiment, any number of rotatable disks 42 can be used, however, each must be separated from its adjacent disk 42 by a stationary disk 34. In addition, each disk 42 requires separate rotation means which can be either manually or electrically actuated.

As previously stated, if the flange-like projections 46 in each aperture 44 in disk 42 are aligned with the apertures 36 in disk 34, fluid flow is diverted and a fluid pressure drop results. To accomplish this, disk 42 is angularly positioned, as in FIG. 3, so that the shank of bolt 40 contacts the right end of elongated slot 50. If all of the disks 42 are angularly positioned so that their respective flange-like projections 46 in apertures 44 are aligned with the apertures 36 in disk 34, as illustrated in FIG. 1, then a maximum impedance condition is present and the total fluid pressure drop is maximized. This maximum impedance condition can be achieved by axially moving the respective shaft 56 for each disk 42 to the right. This axial movement results in angular displacement of each disk 42 until the shank of bolt 40 contacts the right end of elongated slot 50 in each disk 42. In this maximum impedance condition, each of the flange-like projections 46 in apertures 44 diverts the flow of fluid through four right-angle turns resulting in a pressure drop at each of the disks 42. Thus, in the maximum impedance condition, the total number of pressure drops is proportional to the total number of disks 42 used.

Conversely, the total impedance can be reduced to a minimum by aligning the through portion 48 of each aperture 44 in disk 42 with each aperture 36 in disk 34. This condition results in no multi-turn diversions of the fluid passing through the valve and thus minimizes any pressure drop. To effect this condition, shaft 56 is moved axially to the left which results in angular displacement of disk 42 until the shank of bolt 40 contacts the left end of elongated slot 50 in disk 42. Such axial movement of shaft 56 results in the angular displacement of disk 42 through the aforesaid predetermined angle $\alpha$. If all of the disk 42 are angularly positioned so that their respective through portions 48 of aperture 44 are aligned with aperture 36 in disk 34, as illustrated in FIG. 6, then a zero impedance condition is present and any fluid pressure drop is minimized.

By selectively angularly positioning disk 42 so that either the through portions 48 of apertures 44 or the flange-like projections 46 in aperture 44 are aligned with apertures 36 in disk 34, the number of pressure drops, up to the total number of disks 42 used, can be varied. For example, FIG. 7 shows a condition wherein only one out of the three rotatable disks 42 is angularly positioned so as to divert the flow of fluid by the flange-like projections 48 in its apertures 44. In this case, four flow direction changes occur, however, a total of twelve flow direction changes is possible if all three rotatable disks 42 are positioned so as to divert the flow of fluid therethrough. Thus, in this manner the total pressure drop can be varied to compensate for the fluid passing through the valve 10.

Variations of the present invention will be apparent to those having ordinary skill in the art and the invention is limited only by the spirit and scope of the following claims.

I claim:

1. A ball valve comprising a housing having an inlet port and an outlet port, ball means for opening and closing said valve, feeder ring means sealably mating with said ball means for directing the flow of fluid through said valve into a plurality of passages, and labyrinth means for varying the pressure reduction of the fluid that passes through said valve by subjecting the fluid to a series of turns, said labyrinth means having the same plurality of multi-turn passages as said feeder ring means with the passages of said feeder ring means and said labyrinth means being aligned at their mating surfaces.

2. The valve as defined in claim 1 wherein said passages in said directing feeder ring means are relatively uniformly spaced.

3. The valve as defined in claim 1 wherein said varying labyrinth means comprises a fixed disk having apertures therein and a rotatable disk with mating apertures therein, said fixed disk and said rotatable disk being positioned between said directing feeder ring means and said outlet port.

4. The valve as defined in claim 3 wherein said apertures in said rotatable disk further include means for diverting said fluid flow through said valve, said diverting means being aligned with said apertures in said fixed disk causing a pressure reduction in said fluid passing therethrough when said rotatable disk is rotated through a predetermined angle.

5. The valve as defined in claim 4 further including means for rotating said rotatable disk through said predetermined angle.

6. The valve as defined in claim 4 further including means for indicating the relative angular position of said rotatable disk.

7. The valve as defined in claim 1 further including sealing means interposed between said opening and closing ball means and said directing feeder ring means, said sealing means being biased to firmly contact said opening and closing ball means preventing any fluid flow between said opening and closing ball means and said directing feeder ring means.

8. The valve as defined in claim 1 wherein said varying labyrinth means comprises a plurality of fixed disks having apertures therein and a plurality of rotatable disks with mating apertures therein, each of said rotatable disks being interposed between adjacent fixed disks, said fixed disks and said rotatable disks being positioned between said directing feeder ring means and said outlet port.

9. The valve as defined in claim 8 wherein said apertures in each of said rotatable disks further include means for diverting said fluid flow through said valve, said diverting means in one or more of said rotatable disks being aligned with said apertures in said fixed disks adjacent said one or more of said rotatable disks causing a pressure reduction in said fluid passing therethrough when said one or more of said rotatable disks is rotated through a predetermined angle.

10. The valve as defined in claim 9 further including means for selectively rotating each of said rotatable disks through said predetermined angle.

11. The valve as defined in claim 9 further including means for indicating the relative angular position of each of said rotatable disks.

* * * * *